United States Patent

[11] 3,555,247

[72] Inventor Norman P. Gruczelak
Houston, Tex.
[21] Appl. No. 655,144
[22] Filed July 21, 1967
[45] Patented Jan. 12, 1971
[73] Assignee Texas Instruments Incorporated
Dallas, Tex.
a corporation of Delaware

[54] STATION DOCUMENT READER
18 Claims, 18 Drawing Figs.

[52] U.S. Cl. .......... 235/61.11
[51] Int. Cl. .......... G06k 7/10
[50] Field of Search .......... 235/61.115, 61.115CR, 61.112, 61.7(b), 61.115 Limited; 339/17F(limited search); 250/219IDC; 340/149A; 179/6.3CC, 90

[56] References Cited

UNITED STATES PATENTS

| | | | |
|---|---|---|---|
| 3,300,572 | 1/1967 | Dahlgren et al. | 339/17F |
| 3,184,714 | 5/1965 | Brown Jr., et al. | 235/61.115 |
| 3,157,451 | 11/1964 | Martini | 339/17F |
| 2,897,254 | 7/1959 | Dickinson | 339/17F |
| 2,313,119 | 3/1943 | Brana | 250/219(IDC) |

*Primary Examiner*—Maynard R. Wilbur
*Assistant Examiner*—William W. Cochran II
*Attorneys*—Samuel M. Mims, Jr., James O. Dixon, Andrew M. Hassell, Harold Levine, Rene E. Grossman, John E. Vandigriff and Richards, Harris and Hubbard, E. Mickey Hubbard, V. Bryan and Harold E. Meier

ABSTRACT: A remote station document reader operating in conjunction with a master control having an array of phototransistors for translating coded data on a document into electrical pulses. The phototransistors are mounted on a carriage movable between a home position and a second position by a motor energized by the insertion of a coded document into the remote station reader. Various checking devices are located in the reader to insure proper orientation of an inserted document prior to reading the coded data. Both coded identification badges and punched hole cards can be read by the reader. When a coded identification badge is in the process of being read, a latch mechanism prevents removal of the badge prior to the code thereon being read.

INVENTOR
NORMAN P. GRUCZELAK
Harold E. Meier
ATTORNEY

INVENTOR
NORMAN P. GRUCZELAK

Harold C. Meier

ATTORNEY

INVENTOR
NORMAN P. GRUCZELAK

*Harold E. Meier*

ATTORNEY

INVENTOR
NORMAN P. GRUCZELAK

Harold C. Meier

ATTORNEY

STATION DOCUMENT READER

This invention relates to a document reader, and more particularly to a remote station document reader operating in conjunction with a master control and other remote station readers.

Large modern manufacturing plants use computers for process flow and control, personnel attendance and allocation, continuous inventory control, and many other important business functions. To make maximum use of expensive computer time, to eliminate card shuffling, and to provide up to date control, it is desirable that the reporting on material and process flow, work orders and time clock information be performed as quickly as possible. This has been achieved by locating data gathering stations at key areas such that responsible persons may immediately report all important information. Such remote station readers must be reliable and comparatively simple to operate.

Presently, the most common reading technique for punched cards and identification badges is by means of mechanical contacts which pass through the punched holes and make contact with a conductive surface. In a sense, the punched card to or badge acts as an insulator to selectively make or prevent contact between the mechanical fingers and h the conductive surface. Due to uncontrollable environmental conditions encountered where remote station readers are usually located, dirt interruption and corrosion of vital contacts is common in the mechanical finger readers. Another well known punched hole code reader employs photo-optical means of sensing a punched hole. With the photo-optical type readers, dirt and corrosion problems do not exist. Another shortcoming of the mechanical contact reader is that it is unreliable at high reading speeds whereas the photo-optical means is not speed limited.

Many presently available punched hole remote station readers use a stationary array of mechanical contacts or photo-optical sensors with a coded document being passed over this array at a constant speed during the reading operation. This requires a method of recognizing the presence of a data column, or "clock," which is usually a data row on the document where all possible code containing columns are punched, or by sensing the first row on the punched document and generating a clock frequency corresponding to the card speed. The obvious disadvantage of using a data track for controlling document speed is the reduction of data content possible. The clock frequency system requires a constant, predetermined document speed and position errors become accumulative from the first to last row. Thus, at high speeds, any slippage of the document between its drive wheels, or any other cause of document speed variation, results in reading errors.

Remote station badge readers typically employ stationary reading units using a mechanical contact or photodetector for each of the various possible data positions in the badge. Obviously, this results in a highly inefficient use of detectors.

In accordance with this invention, there is provided a card/badge remote station reader employing phototransistors interconnected to a master controller through a flexible cable and mounted on a movable carriage with a minimum of mechanical and electrical adjustment. Separate card and badge entry slots and guides are provided with the card entry mechanism including an inject/eject mechanism for properly positioning and ejecting a coded card. A sensing device checks when the card is properly oriented and located in its read position. An incorrectly oriented card is automatically ejected by means of a second position detecting device. Pressure springs are provided in the badge reading area to precisely orient an inserted badge. Upon insertion, a badge is latched in position by a latch arm engaging a prepunched rectangular hole in the badge proper. A photoresistance device senses when the badge is locked in the correct reading position before the code stored thereon is read. Again, an incorrectly oriented badge is rejected.

In a typical embodiment of the invention, the actual reading mechanism consists of an array of twenty-four lamps positioned above the card and badge reading areas. An array of thirteen photodetectors are mounted on a printed circuit board fastened to a movable carriage and positioned below the lamp array opposite the card and badge. The card and badge reading areas each include a clock track having slots corresponding with the rows of prepunched holes in the card or badge, providing accurate monitoring of the carriage position during the reading operation.

Since the card or badge is stationary during the reading cycle and is accurately positioned with respect to a stationary external co clock track, the remote station card/badge reader of this invention is not velocity sensitive and no data content reduction of the card is necessary. Also, angular alignment of the card with respect to the data holes in a particular row and its corresponding "clock" slot is achieved far more easily than if the card is moving during the reading operation; especially when high data reading rates are required.

A more complete understanding of the invention and its advantages will be apparent from the specification and claims and from the accompanying drawings illustrative of the invention.

Referring to the drawings.

Figure 1:
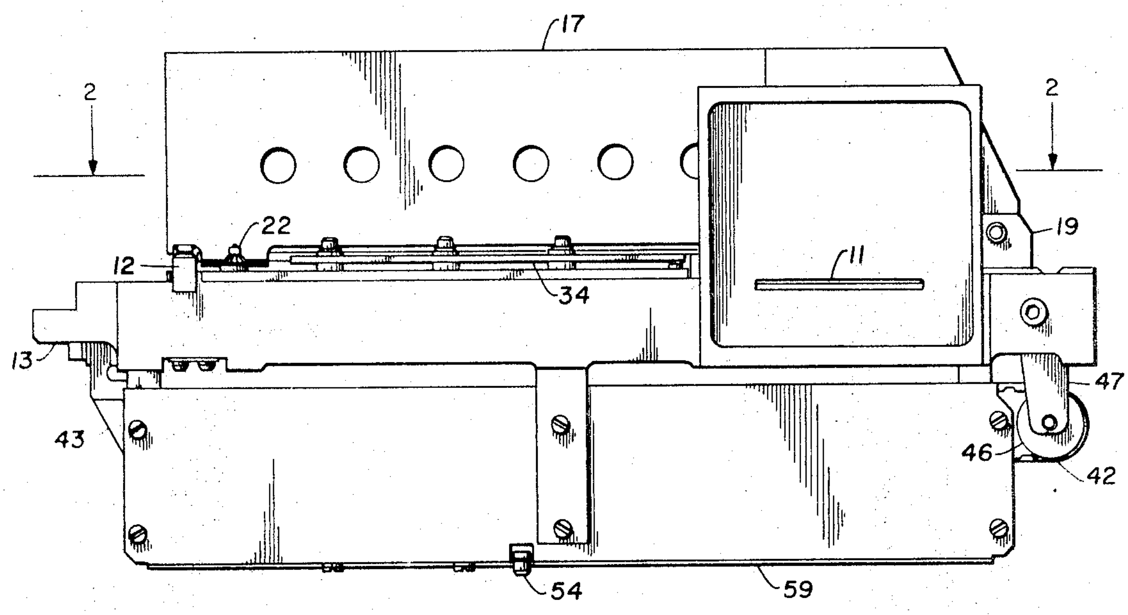
FIG. 1 is a front view of a card/badge remote station reader showing the badge and card entry slots.
Figure 2:
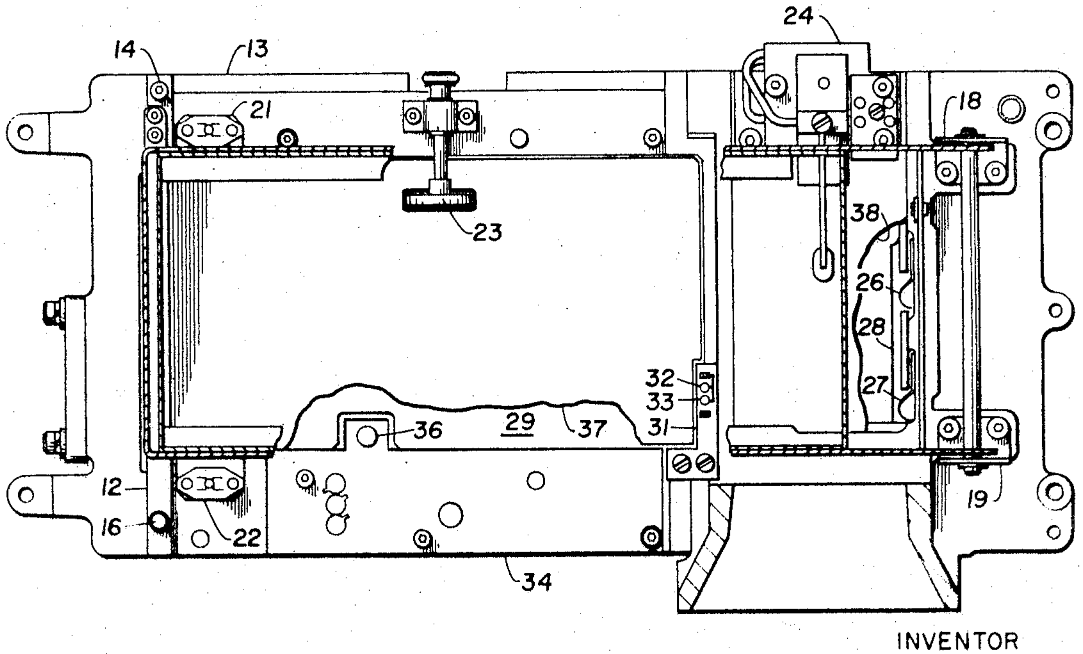
FIG. 2 is a top view of a card/badge remote station reader partially insect in section taken along the line 2–2 of FIG. 1.
Figure 3:
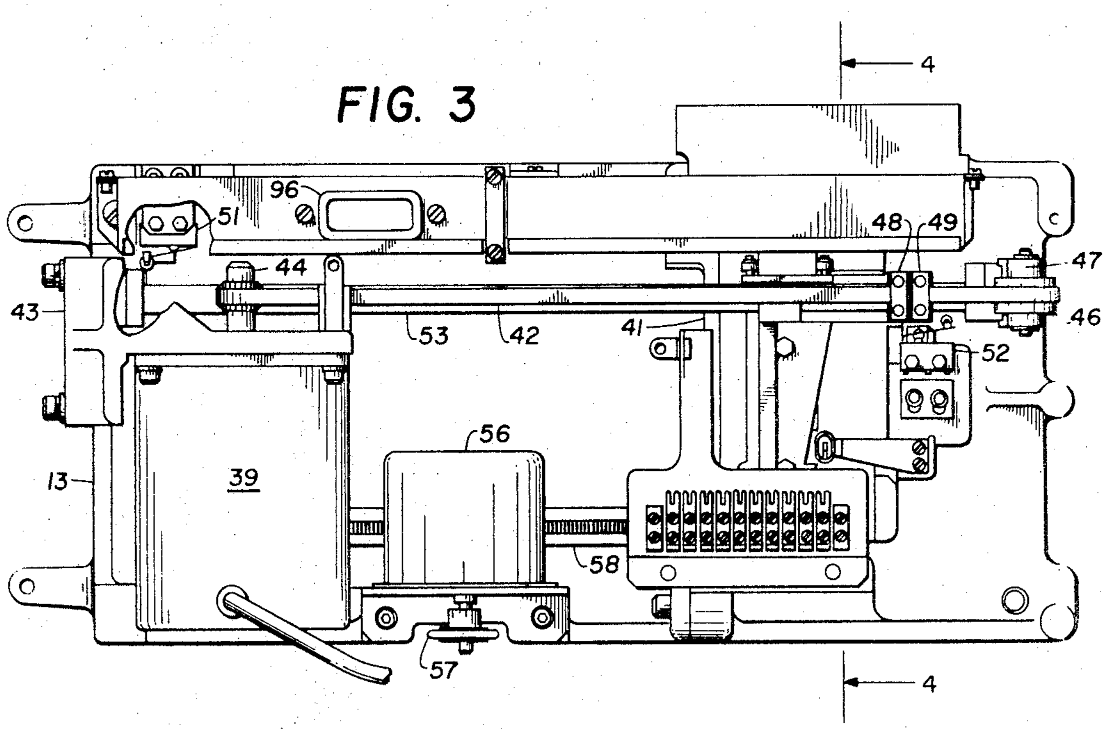
FIG. 3 is a bottom view showing the carriage drive and inject/eject drive.

Referring to FIGS. 1—3, there is shown a remote station card/badge reader having a housing with a badge entry slot 11 and a card entry bridge 12 bolted to a frame 13 by means of machine screws 14 and 16. A light source cover 17 is hinged to the frame 13 by means of pivot brackets 18 and 19 bolted to said frame. The light source cover 17 is properly oriented in the operating position by means of spring clips 21 and 22.

Referring specifically to FIG. 2, there is shown an inject/eject rubber covered drive wheel 23 for locating a card in its proper reading position. A badge latch 24 similarly holds a badge in its proper orientation during the reading operation. At the right edge of the badge area there are two badge positioning springs 26 and 27 to guide a badge into its proper reading location. A platen 28 is also included to further insure proper positioning of a badge during the reading operation. Thus, it can be seen that by means of the latch assembly 24, the positioning springs 26 and 27, and the platen 28, a coded badge will be properly oriented to insure accurate reading of the code stored thereon. Similarly, in addition to the drive wheel 23, the card reading area includes a platen 29 and an inverted card sensor 31 to insure proper orientation of a card during the code reading operation. The inverted card sensor 31 includes two phototransistors 32 and 33 to generate a signal when the card is fully inserted into the system and properly oriented. The operation of phototransistors 32 and 33 will be explained more fully later. The electronic control circuitry (to be described) for the reader is assembled on a printed circuit board 34 that includes a phototransistor 36 to activate the reading system when a card is inserted through the bridge 12. To insure an even distribution of light over the entire code carrying area of a card or badge, the card reading area includes a light diffuser 37 and the badge reading area includes a light diffuser 38.

Figures 4, 14:
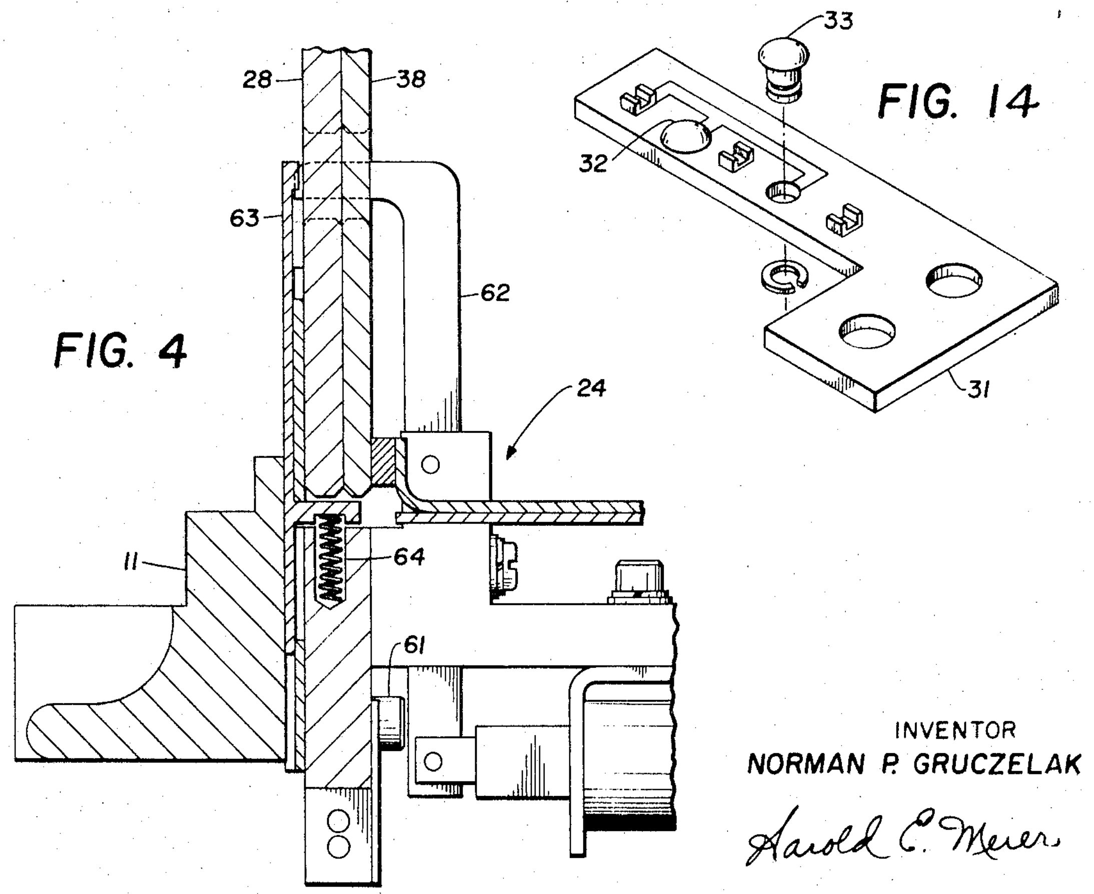
FIG. 4 is a sectional view taken along the line 4–4 of FIG. 3.
FIG. 14 shows the lamp array for the badge reading area and the electrical connection between the card and badge lamp array.

Referring now specifically to FIGS. 1 and 3, there is shown a motor 39 coupled to a sensor carriage 41 by means of a flexible nonslip belt 42. The motor 39 is mounted to the frame 13 by means of a bracket 43 and drives a gear 44. The belt 42 engages the gear 44 and an idler gear 46 fastened to the frame 13 by means of a bracket 47; it is fastened to the carriage 41 by means of clamping plates 48 and 49. The carriage 41 is mounted on a shaft 53 and is accurately guided by means of a roller bearing (not shown); its limits of travel are controlled by two microswitches 51 and 52. A clock track 58 generates a series of pulses to a photosensitive device on the carriage 41 to provide accurate positioning of the carriage during the reading operation. The drive wheel 23 is driven by means of an inject/eject (i/e) motor 56 through a flexible belt 57. A flexible cable trough 59, mounted to the underside of the frame 13, contains a printed circuit cable (not shown) connecting photodetectors on the carriage 41 to the master controller through a cable connector 54. To insure a correct reading of the coded data on a badge inserted into the slot 11, it essential that the badge be properly oriented and secured in this position. Referring to FIG. 4, there is shown the latch assembly 24 bolted to the frame 13 by means of a machine screw 61. A latch arm 62 is shown in its badge holding position passing through openings in the light diffuser 38 and the badge platen 28. The diffuser 38 and platen 28 are shown in engagement with a switch actuator 63 spring loaded by means of a compression spring 64. As a badge is inserted through the slot 11 into its reading position, it forces the actuator 63 into the position shown thereby actuating a latch arm energizing a circuit to be described. When the latch arm is disengaged, the spring loaded actuator 63 ejects the badge toward the operator through the slot 11.

Figures 5, 6, 7:
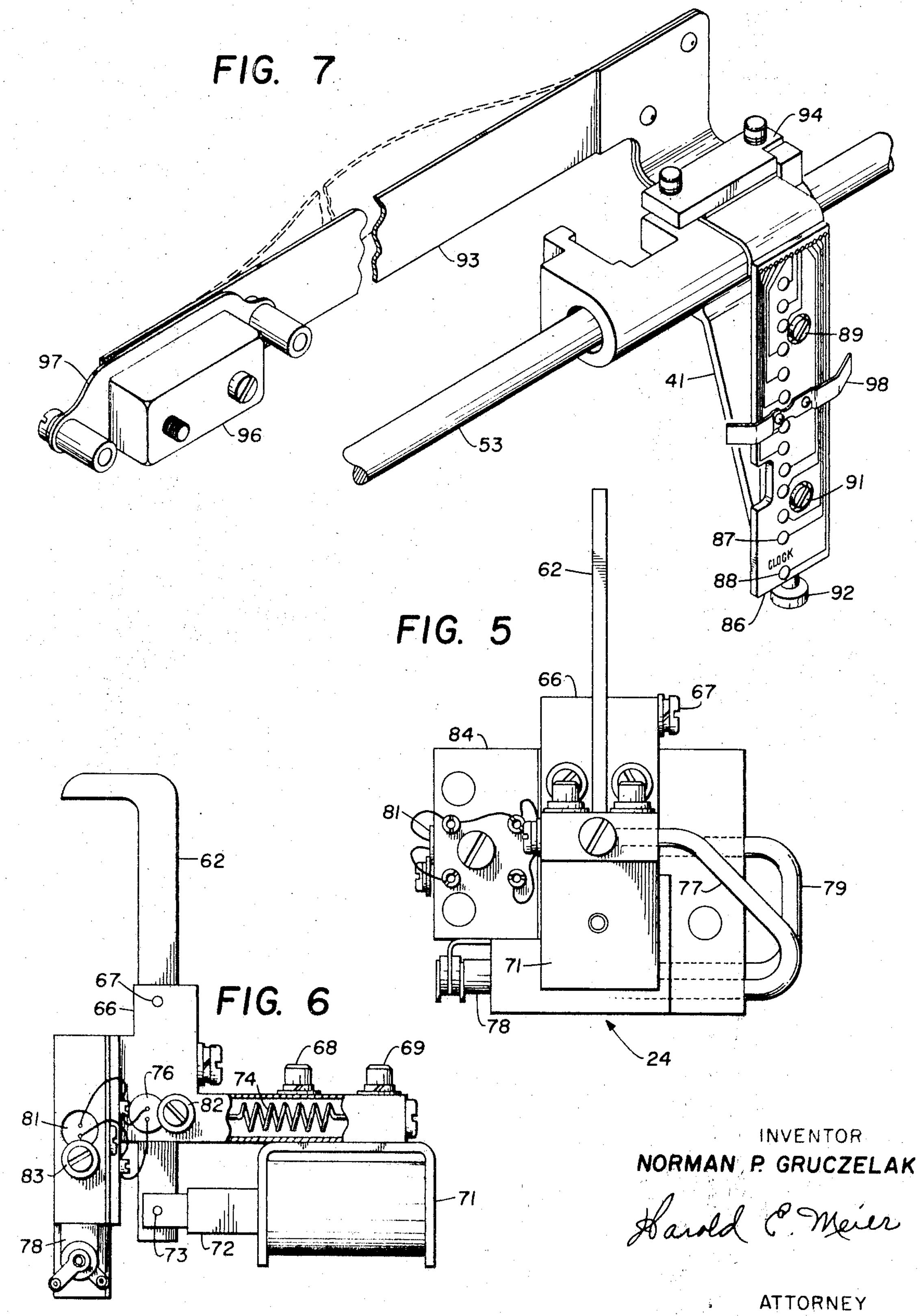
FIG. 5 is a front view of the card latch mechanism.
FIG. 6 is a side view of the card latch mechanism.
FIG. 7 is an isometric view of the photodetector code sensors and the movable carriage.

Referring to FIGS. 6 and 7, there is shown the front and side view, respectively, of the latch assembly 24 including the latch arm 62 pivotally mounted in a frame 66 by means of a machine screw 67. Bolted to the frame 66 by means of screws 68 and 69 is a solenoid 71 having a plunger 72 pivotally connected to the latch arm 62 by means of a roll pin 73. Energizing the solenoid 71 rotates the latch arm 62 into the position shown in FIGS. 4 and 6. When the solenoid 71 is deenergized, a spring 74 rotates the latch arm 62 clockwise to release a badge held in position during the reading operation.

Rotation of the latch arm 62 about its pivot is sensed by means of a photoresistance device 76 responsive to light transmitted thereto by means of a light pipe 77 (FIG. 5) from an incandescent lamp (not shown) mounted in a socket 78. A light pipe 79 (FIG. 5) also transmits light from this lamp to a photoresistance device 81 to detect movement of the actuator 63. The photoresistance devices 76 and 81 are held in place by means of machine screws 82 and 83, respectively, and are electrically connected to terminals on a connector board 84.

Figure 17:
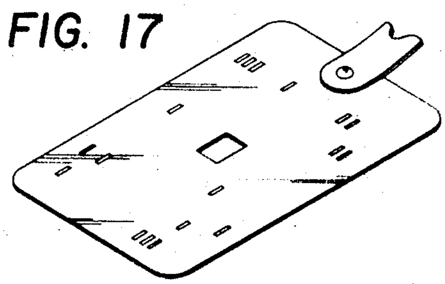
FIG. 17 shows a typical punched hole coded badge.

In operation a badge is inserted through the slot 11 thereby causing the switch actuator 63 to interrupt light from the pipe 79 to the photoresistance device 81. Interrupting light to the photoresistance device 81 generates a signal to an electronic control circuit (to be described). The electrical circuit energizes the solenoid 71 thereby rotating the latch arm 62 in a counterclockwise direction until it engages an aperture in the badge such as shown in FIG. 17, thereby holding it securely in place during the code reading operation. When the latch arm 62 has securely latched the badge in its properly oriented position, the light beam transmitted by the light pipe 77 impinges on the photoresistance device 76. The photoresistance device 76 generates a signal to the code reading circuitry (to be described) indicating that the badge is properly oriented. If the badge is improperly oriented in the reading area, the latch arm will not align with the badge aperture and the actuator 63 will eject the inserted badge.

The code reading circuitry for both the card and badge areas is shown in FIG. 7 and includes a printed circuit board 86 having 12 light responsive code sensors 87 and one light responsive clock pulse sensor 88. The circuit board 86 is bolted to the carriage 41 by means of screws 89 and 91. The carriage 41 travels along the shaft 53 and is accurately positioned by means of a roller bearing 92 positioned in a guide track (not shown). A flexible printed circuit cable 93 is soldered to the conductors on the board 86 and mounted to the carriage 41 by means of a support plate 94. Attached to the other end of the printed circuit cable 93 is a pin connector 96 including a bracket 97 for mounting to the trough 59. A card shoe 98 riveted to the board 86 rides against a card as the carriage 41 traverses the card reading area thereby preventing the carriage 41 from being jammed on a bowed or mutilated card. As mentioned previously, the carriage 41 is moved along the shaft 53 by means of a drive motor 39 and a flexible belt 42.

In any system where an electrical connection is required between some fixed point, such as connector 96, and a body having linear motion, such as carriage 41, the connection is difficult to achieve particularly where high acceleration and/or long distances are involved. Sliding contacts have been found not to be reliable particularly in applications where digital signals are being transmitted. Dirt and contact corrosion on a sliding contact can easily cause false signals to be generated. A direct cable connection for such applications usually results in the cable being flexed excessively at some fixed point.

Figures 8, 9, 10, 11:
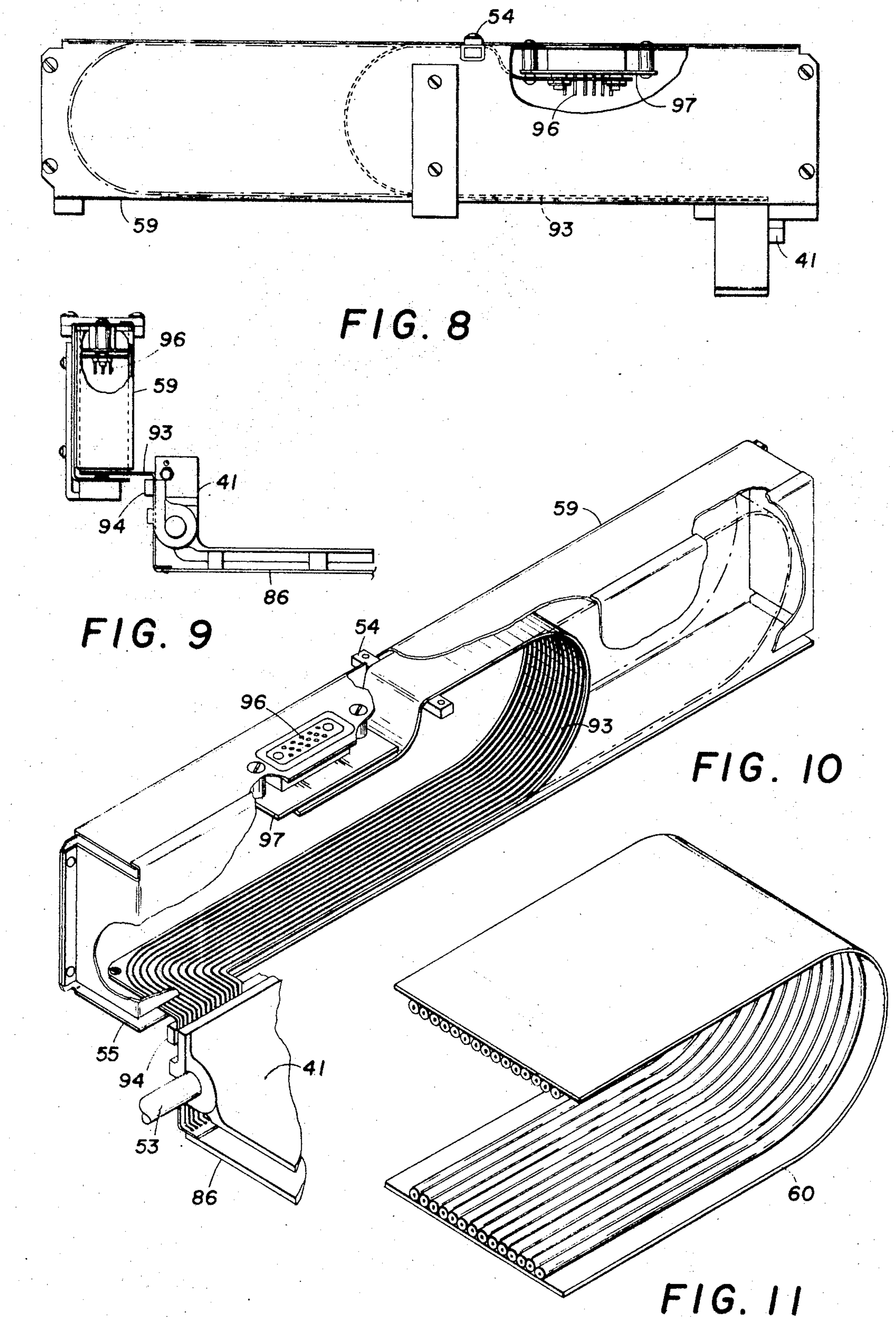
FIG. 8 is a side view of the flexible cable housing for the printed circuit connecting the photodetector code sensors to the master controller.
FIG. 9 is a front view of the flexible cable housing of FIG. 8.
FIG. 10 is an isometric view of the printed circuit cable and the housing of FIG. 8.
FIG. 11 is a partial isometric view of a ribbon cable for interconnecting the photodetector code sensors to the master control.

Referring to FIGS. 8—10, there is shown a flexible connector system interconnecting the linearly moving carriage 41 to a fixed connector 96. The connector 96 is bolted to the trough 59 by means of the bracket 97. A loop is formed in the printed circuit cable 93 by means of a cable clamp 54 fastening the cable to the trough 59. Referring specifically to FIG. 10, the cable 93 makes a loop inside the trough 59 and is brought out for connection to the carriage 41 through a slot 55 by means of a right angle turn in the cable. The cable 93 is attached to the carriage 41 by means of the support plate 94, and is mechanically and electrically connected to the circuit board 86 (FIG. 7). Where the printed circuit cable 93 contacts the surfaces of the trough 59, these surfaces are coated with a lubricating plastic, such as Teflon.

If the loop in the printed circuit cable 93 is properly dimensioned, the amount of strain placed on the cable is reduced to negligible proportions and flexing of the cable is distributed along its length. A good portion of the cable mass is concentrated in the loop itself which moves at half the velocity and acceleration of the carriage 41. No unnecessary external parts, such as sliding contacts, undergo motion thus appreciably reducing the power required to accelerate and maintain movement of the carriage 41. As shown in FIGS. 8 and 10, the carriage 41 is in its second position, the entire assembly being inverted with reference to FIG. 3. When the carriage 41 moves to its home position, the loop of the printed circuit cable 93 travels the length of the trough 59 to the dotted outline position.

The printed circuit cable 93 may be any of many well known designs. For example, as shown, the printed circuit cable 93 includes a number of solid copper conductors bonded to a flexible plastic base material. This type construction has the advantage of very low mass and is flexible, yet stiff enough to easily form a loop. Another type of flexible cable is shown in FIG. 11 and includes a plurality of round conductors bound together to form a ribbon cable. To achieve the necessary stiffness for good loop action, a thin hardened steel sheet 60 forms a backup surface for the ribbon cable. Where a ribbon cable is used, the steel sheet 60 is in contact with the surfaces of the trough 59.

In operation, after a card or badge has been properly oriented, the motor 39 is energized causing the carriage 41 to be moved from its home position, as shown in FIG. 3, to a second position where it actuates the microswitch 51. Actuating the microswitch 51 reverses the direction of rotation of the motor 39 and the carriage 41 returns to its home position. When the carriage reaches its home position, the microswitch 52 is actuated thereby deenergizing the motor 39. As the carriage 41 traverses the area from its home position to its second position, the code sensors 87 respond to light passing through punched holes in the card or badge thereby generating electrical signals at the contact pins of the connector 96. The light sensitive clock sensor 88 generates a series of electrical pulses as it traverses the area of the clock strip 58 during movement of the carriage 41.

Figure 12:
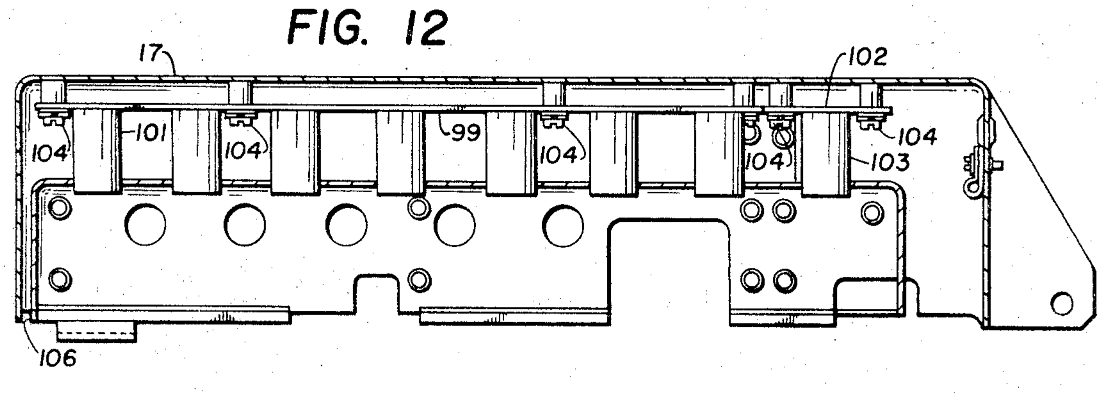
FIG. 12 is a sectional view of the lamp array for the card and badge reading areas.
Figure 13:
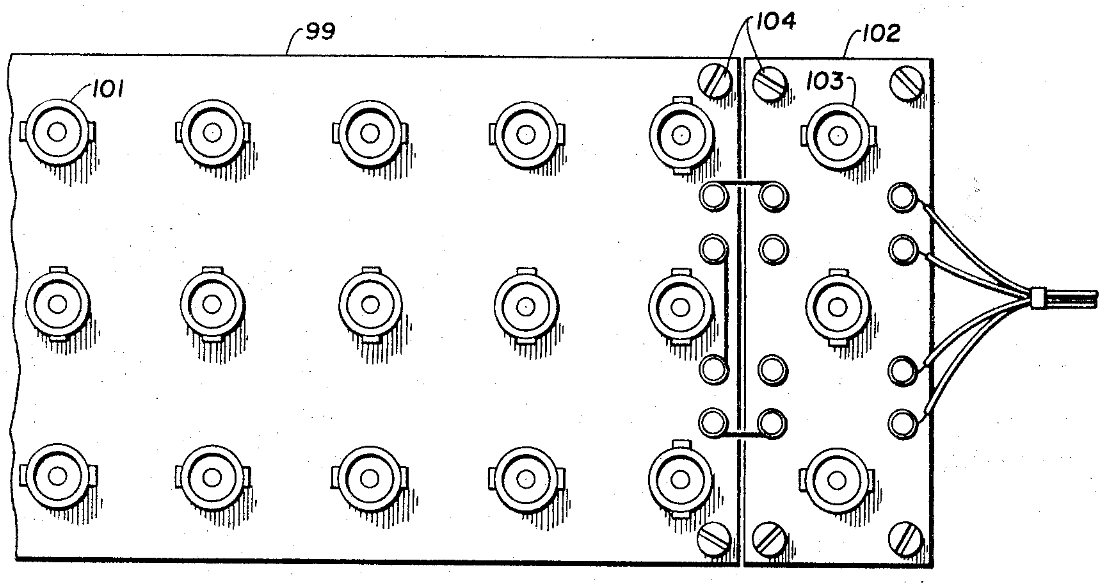
FIG. 13 is a bottom view of the lamp array for the card reading area.

Light for actuating the code sensors 87 is provided by means of the light chamber 17 shown in FIGS. 12 and 13. The light chamber 17 includes a circuit board 99 having attached thereto twenty-one light sockets 101 each containing an incandescent lamp (not shown) for illuminating the card reading area. A second printed circuit board 102 has three sockets 103 each containing an incandescent lamp (not shown) for illuminating the badge reading area. The circuit boards 99 and 102 are bolted to the chamber 17 by means of machine screws 104. The twenty-four light sockets of the card and badge reading circuit boards extend into a reflector 106 to insure that the respective reading areas are completely illuminated. The diffusers 37 and 38 of the card and badge reading areas, respectively, further assure an even distribution of light during the code reading operations. The lamps for illuminating the badge and card reading areas are turned on when the drive motor 39 is energized and turned off when the carriage 41 reaches its second position.

Figures 15, 16:
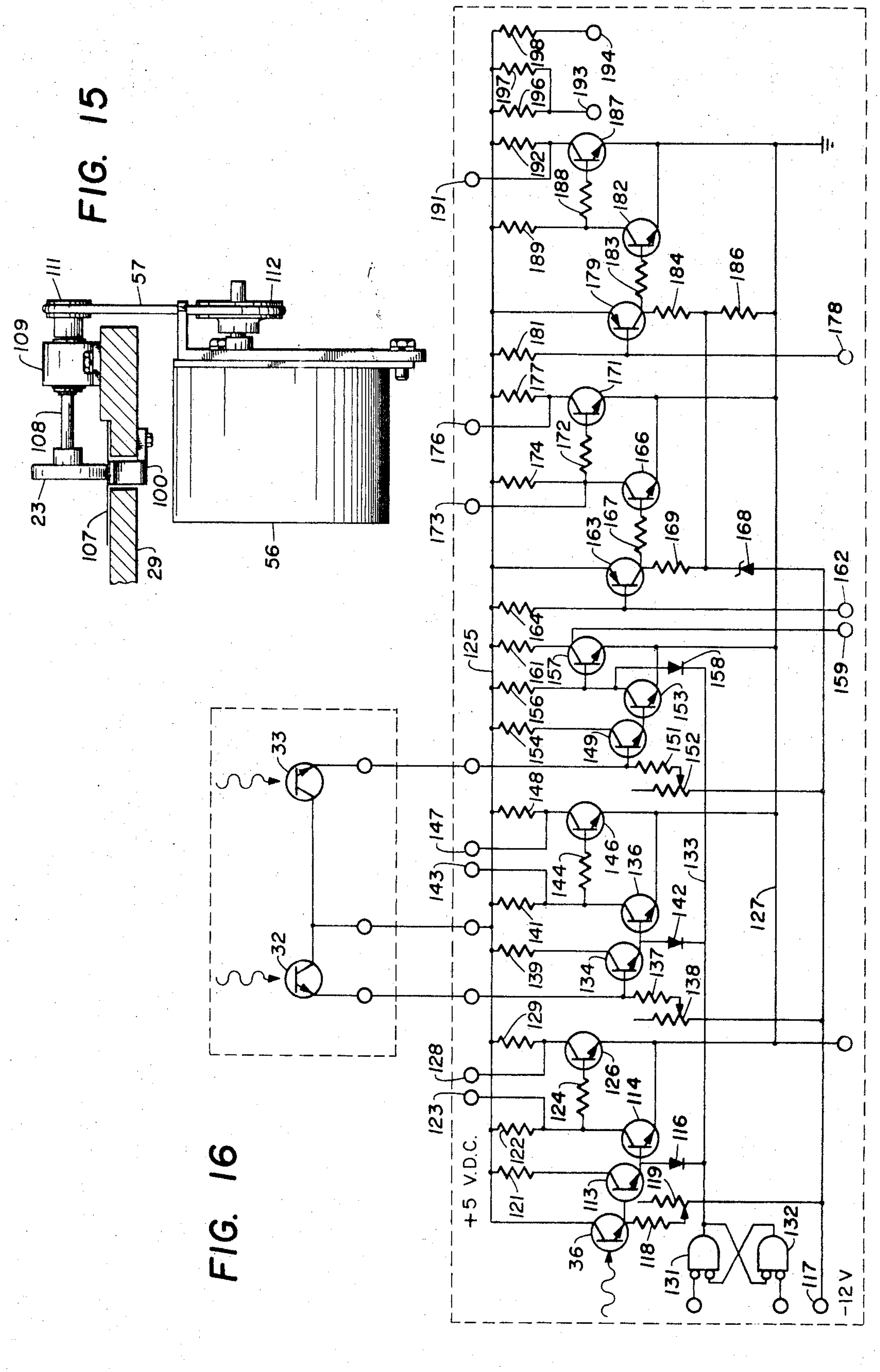
FIG. 15 is a side view of the inject/eject card drive.
FIG. 16 is a schematic of the electrical control circuit for the card/badge remote station reader of FIG. 1.

Referring to FIG. 2 and 16 there is shown the inverted card sensor 31 including the phototransistors 32 and 33. Considering that the present reader is designed for punched hole cards having one corner cut at an angle such as card 107 shown in FIG. 18, the phototransistor 33 generates an electrical signal if light thereto is cut off by an improperly positioned card. An improperly positioned card is one where any corner but the cut off corner is located over the sensor 33. The phototransistor 32 generates an electrical signal to an electronic control system to be described whenever a card inserted through the bridge 12 is properly positioned by the drive wheel 23. Thus, a card properly inserted into the reading area causes the phototransistor 32 to generate a signal but the phototransistor 33 does not. On the other hand, when a card has been improperly inserted into the system, either or both of the phototransistors 32 and 33 will generate an electrical signal.

As explained previously, the drive wheel 23, driven by the i/e motor 56, positions the card after it has been inserted through the bridge 12. Referring to FIG. 15, there is shown in detail the card positioning mechanism including the drive wheel 23 in engagement with a card 107 on the platen 29. A leaf spring 100 is located under the card 107 at the drive wheel 23 to supply a force between the card and the wheel; the coefficient of friction between the rubber coated wheel is greater than that of the spring and the card is propelled to the reading area. The drive wheel 23 is fastened to a shaft 108 journaled in a pillow block 109 which is bolted to the platen 29. A pulley 111 is also fastened to the shaft 108. Attached to the shaft shaft of the i/e motor 56 is a pulley 112. The motor 56 drives the shaft 108 by means of the flexible belt 57.

In operation, a card is inserted through the bridge 12 until it passes the phototransistor 36 and engages the drive wheel 23. As the card passes the phototransistor 36 and engages the drive wheel 23. As the card passes the phototransistor 36, it activates an electronic circuit which energizes the i/e motor 56 and the drive wheel 23 moves the card 107 to its proper reading position. When the card is fully inserted, the phototransistor 32 generates an electrical signal which deenergizes the motor 56. However, should the card be improperly inserted thereby causing the phototransistor 33 to generate a signal, the motor 56 will be energized in the reverse direction thereby automatically ejecting the improperly inserted card. The card must then be removed and inserted in the correct orientation. The i/e motor 56 will also be energized to eject a card after the code reading operation has been completed, as will be explained.

Referring to FIG. 16, there is shown the electronic circuitry for controlling the various operations of the remote station reader previously described. The circuitry shown is that contained on the printed circuit board 34 and the inverted card sensor board 31 and does not include circuitry in the master controller to which the circuit of FIG. 16 is connected. The phototransistor 36 has an emitter electrode tied to the base electrode of a transistor 113 forming an emitter-follower pair with a transistor 114. The base of transistor 114 is tied to the emitter of transistor 113 and to the anode electrode of a diode 116. The emitter electrode of the phototransistor 36 also connects to a −12 volt direct current source by means of a terminal 117 through a resistor 118 and a potentiometer 119. A +5 volt direct current line 125 is connected to the collector electrode of the phototransistor 36. The collector electrodes of the transistors 113 and 114 are also tied to the +5 volt line 125 by means of resistors 121 and 122, respectively. In addition, the collector electrode of the transistor 114 forms a common junction with a terminal 123 and a base drive resistor 124 tied to the base electrode of a transistor 126 having an emitter electrode interconnected with the emitter of transistor 114 and ground by means of a line 127. A terminal 128 and a resistor 129 are tied to the collector electrode of transistor 126, the resistor 129 also being connected to the +5 volt line 125.

The cathode electrode of the diode 116 is tied to the output of a NAND gate 131 which is part of a flip-flop circuit including a NAND gate 132. The output of the NAND gate 131 is tied to one input of the NAND gate 132, and similarly, the output of the NAND gate 132 is connected to one input of the NAND gate 131. A second input to the NAND gate 131 is a logic signal from the master control center indicating that the carriage 41 is at its home position. A second input to the NAND gate 132 is a logic signal from the master controller indicating whether this reading station is busy or not busy. The purpose of the flip-flop circuit is to insure a proper voltage level on line 133 should the carriage 41 interrupt light impinging on various photo sensing devices, such as the phototransistor 36.

The circuit including the phototransistor 36, and the transistors 113, 114, and 126 comprise a logic control system to instruct the master controller that a card is being entered into the card reading section of the substation. When a card is not in the system, the transistors 113 and 114 are conducting and the transistor 126 is nonconducting. Conduction of the transistor 114 causes the terminal 123 and the base electrode of transistor 126 to be essentially at a ground potential. Nonconduction of transistor 126 causes the voltage at the collector electrode to be approximately +5 volts. As a card is inset inserted under the bridge 12 and past the phototransistor 36, the transistors 113 and 114 become nonconductive and the transistor 126 becomes conductive. Nonconduction of the transistor 114 causes its electrode and the base electrode of transistor 126 to be approximately +5 volts, and conduction of the transistor 126 causes its collector electrode to be essentially at ground potential. The +5 volt signal at the terminal 123 is transmitted to the master controller and if the master controller is ready to receive information from the reading station, it generates a signal to energize the i/e motor 56 and the card is transported to the reading area.

In the reading area, the phototransistors 32 and 33 determine whether the card is fully inserted and whether or not it is properly oriented. Phototransistor 32 has an emitter electrode coupled to the base electrode of a transistor 134 forming an emitter-follower configuration with a transistor 136. The emitter electrode of the phototransistor 32 is also tied to the terminal 117 through a resistor 137 and a potentiometer 138. Phototransistor 32 is connected to the line 125 through its collector electrode. Transistors 134 and 136 are also tied to the line 125 through resistors 139 and 141, respectively. The emitter electrode of the transistor 134 and the base electrode of the transistor 136 form a common junction with the anode of a diode 142 which has a cathode electrode connected to the output of the NAND gate 131. The collector electrode of the transistor 136, in addition to connecting to resistor 141, also connects to a terminal 143 and a base drive resistor 144 coupled to the base electrode of a transistor 146. Transistors 136 and 146 have their emitter electrodes tied to ground by means of the line 127. A terminal 147 is tied to the collector electrode of transistor 146 and to a resistor 148 which connects to the +5 volt direct current line 125.

The circuit including the phototransistor 32 and the transistors 134, 136 and 146 comprise a control circuit for the drive motor 39. When a card if sully inserted into the reading area, it interrupts the light impinging on the phototransistor 32 thereby causing the transistors 134 and 136 to be nonconductive and the transistor 146 to be conducting. This circuit is similar to the one previously described for controlling the i/e motor 56. Nonconduction of the transistor 136 causes the terminal 143 to be approximately +5 volts and conduction of the transistor 146 causes the terminal 147 to be essentially at ground potential. A +5 volt signal at terminal 143 notifies the master controller that a card is fully inserted into the reading area. The master controller then generates a signal, when ready, to energize the drive motor 39 and the carriage 41 traverses the reading area from its home position to its second position and back to its home position. As the carriage 41 returns to its home position, it actuates the microswitch 52 thereby disconnecting the drive motor 39 and signaling the master controller to energize the i/e motor 56 to eject the card from the reading area. The motor 56 is still in the "ready to be energized" condition since the card has interrupted light to the phototransistor 36 and a +5 volt signal appears at terminal 123.

The above operation of the carriage 41 is based on the assumption a card was properly oriented in the reading area. Had the card been inverted, the phototransistor 33 would cause the card to be immediately ejected by energizing the i/e motor 56. The phototransistor 33 has an emitter electrode coupled to the base electrode of a transistor 149 and to terminal 117 through a resistor 151 and a potentiometer 152. Transistor 149 forms an emitter-follower pair with a transistor 153 with their emitter and base electrodes interconnected. Resistors 154 and 156 couple the collector electrode of the transistors 149 and 153, respectively, to the +5 volt line 125. The collector electrode of the transistor 153 is tied to the base electrode of a transistor 157 and to the anode electrode of a diode 158. Transistors 153 and 157 have emitter electrodes forming a common junction to ground by means of the line 127. The cathode electrode of the diode 158 is tied to the output of the NAND gate 131. A terminal 159 connects to the collector electrode of transistor 157 and to a resistor 161 which is also tied to the +5 volt line 125.

In operation, an inverted card inserted into the reading area interrupts light to the phototransistor 33 thereby causing the transistors 149 and 153 to be nonconductive and the transistor 157 to be conductive. Conduction of the transistor 157 causes the signal at terminal 159 to be essentially at ground potential thus notifying the master controller to generate a signal to the i/e motor 56 to eject the inverted card. The motor 56 continues to operate even though the card no longer interrupts light to the phototransistor 33 and is stopped when the card passes the phototransistor 36.

Referring now to the badge reading section of the circuitry of FIG. 16, the photoresistor 81 of the latch mechanism 24 is connected to a terminal 162 forming a junction with the base electrode of a transistor 163 and a resistor 164 which connects to the +5 volt line 125. The emitter electrode of transistor 163 is tied to the +5 volt line 125. Transistor 163 has a collector electrode connected to the base electrode of a transistor 166 through a resistor stopped and to the cathode electrode a Zener diode 168 through a resistor 169. The Zener diode 168 is tied to the terminal 117. Transistor 166 forms a switching circuit with a transistor 171; the collector electrode of transistor 166 and the base electrode of transistor 171 being interconnected through a resistor 172. The collector electrode of transistor 166 is also tied to a terminal 173 and to a resistor 174 which in turn is connected to the +5 volt line 125. Transistors 166 and 171 have their emitter electrodes interconnected and in turn tied to ground by means of the line 127. A terminal 176 connects to the collector electrode of transistor 171 and to a resistor 177 which in turn is connected to the +5 volt line 125.

The circuit consisting of the photoresistor 81 and the transistors 163, 166, and 171 form a badge latch control circuit for the solenoid 71. As a badge is inserted through the slot 11 and interrupts light from the light pipe 79 to the photoresistor 81, the resistance of the device 81 increases to a high value and the voltage at the base electrode of transistor 163 becomes positive with respect to its emitter. Transistor 163 becomes nonconductive thereby driving the base of transistor 166 negative with respect to its emitter and transistor 166 becomes nonconductive. Nonconduction of transistor 166 causes the transistor 171 to conduct with the result that terminal 173 is at approximately a +5 volt level and terminal 176 is essentially at ground potential. With the voltage of terminals 173 and 176 at the levels described, the master controller is notified that the solenoid 71 can be energized. The master controller generates a signal, when ready, which energizes the solenoid 71 and the latch arm 62 is rotated into its badge holding position, such as shown in FIG. 4.

When the latch arm 62 has rotated to its fully engaging position, it passes light to the photoresistor 76 which is connected to a terminal 178 forming a common junction with the base electrode of a transistor 179 and a resistor 181 which in turn is tied to the +5 volt line 125. The emitter electrode of the transistor 179 is also connected to the +5 volt line 125. Transistor 179 has a collector electrode coupled to the base electrode of a transistor 182 through a resistor 183 and to ground through a voltage divider network d including resistors 184 and 186. The common junction of resistors 184 and 186 is tied to the cathode electrode of the Zener diode 168 and held at approximately −4 volts by the Zener diode which has an anode electrode connected to terminal 117. Transistor 182 has a collector electrode coupled to a transistor 187 through a resistor 188 and to the +5 volt line 125 through a resistor 189. Transistors 182 and 187 have their emitter electrodes interconnected to ground. A terminal 191 forms a common junction with the collector electrode of transistor 187 and a resistor 192 which in turn is connected to the +5 volt line 125.

The circuit consisting of the photoresistor 76 and the transistors 179, 182, and 187 comprise a control circuit for the drive motor 39. This circuit operates in essentially the same way as the previously described solenoid control circuit. Thus, as the latch arm 62 passes light to the photoresistor 76, the resistance thereof decays and the voltage at the base of transistor 179 becomes negative with respect to the emitter voltage. Transistor 179 begins to conduct and the voltage at the base electrode of transistor 182 goes positive with respect to the voltage at the emitter electrode. Transistor 182 now begins to conduct and the voltage at its collector electrode goes to essentially ground potential. This results in the transistor 187 being nonconductive and the voltage at terminal 191 is approximately +5 volts. The +5 volt signal at terminal 191 notifies the master controller that a badge is properly inserted and latched in place and ready to be read. When ready, the master controller generates a signal to the drive motor 39 which operates the carriage 41 from its home position to its second position and back to its home position.

As the carriage 41 reaches its home position, it actuates the microswitch 52 thereby deenergizing the drive motor 39 and notifying the master controller that the coded card has been read. The master controller then deenergizes the solenoid 71 permitting the badge to be removed from the slot 11.

Terminals 193 and 194 are coupled to the +5 volt line 125 through resistors 196, 197, and 198, respectively, and provide voltage for the lamps (not shown) for illuminating the phototransistors 32, 33, and 36.

CARD READER OPERATION

Figure 18:
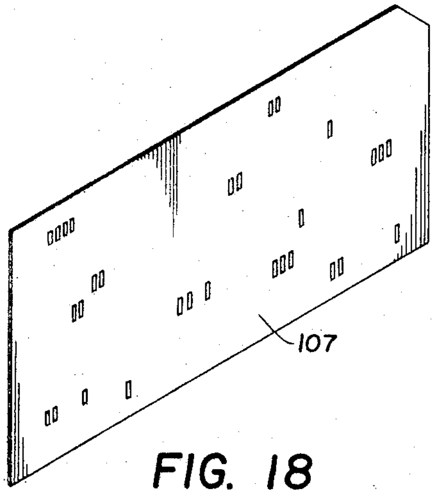
FIG. 18 shows a punched hole coded card.

A card, such as shown in FIG. 18, is inserted through the bridge 12 until it interrupts light incident upon the phototransistor 36 which causes the i/e motor 56 to be energized and the drive wheel 23 transports the card to the reading area. A card fully inserted into the reading area interrupts light to the phototransistor 32, and a master controller is notified that a card is ready to be read. The master controller generates a signal to energize the drive motor 39 and turn on the lamps in the light chamber 17. The motor 39 drives the carriage 41 by means of the flexible belt 53 so that the light sensors 87 mounted to the carriage traverse the card reading area. As the sensors 87 pass under the card, they respond to light from the light chamber 17 passing through punched holes in the card being read. The signals generated by light impinging on the sensors 87 are transmitted to the master controller through the flexible conductor 92 and the connector 96. When the carriage 41 reaches a second position, it actuates a microswitch 51 thereby notifying the master controller to reverse the rotation of the drive motor 39 and to turn off the lamps in the light chamber 17. The drive motor 39 now returns the carriage to its home position wherein it actuates a microswitch 52 thereby shutting off the drive motor 39 and energizing the i/e motor 56. Energizing the motor 56 causes the drive wheel 23 to eject the card from the reading area through the bridge 12.

Accurate position locating of the carriage as it traverses the card reading area is provided for by means of the clock track 58 and the light sensor 88. Light from the light chamber 17 illuminates the clock track 58 and the sensor 88 generates a series of pulses as it traverses the card reading area.

A card improperly inserted under the bridge 12 also turns on the i/e motor 56 as it passes the phototransistor 36 and it will be transported to the reading area. However, the improperly inserted card will interrupt light to the phototransistor 33 which generates a signal to the master controller to reverse the direction of the i/e motor 5 to eject the improperly inserted card. Thus, only cards which are fully inserted into the reading area and properly oriented will energize the drive motor 39.

BADGE READING OPERATION

A punched hole coded badge, such as shown in FIG. 17, is inserted through the slot 11 thereby causing the actuator 63 to interrupt light impinging on the photoresistor 81. Interrupting light to the photoresistor 81 notifies the master controller that a badge is ready to be latched in its reading position. A signal is generated by the master controller to energize the solenoid 71 and the latch arm 62 engages an aperture in the badge thereby holding it in its reading position. As the latch arm 62 engages the badge, it allows light to pass to a photoresistor 76 which generates a signal to notify the master controller that a badge is ready to be read. The master controller, when ready, generates a signal to turn on the lamps of the light chamber 17 and energize the drive motor 39. The code on the badge is read in a manner similar to that described with reference to the card reading operation, with the exception that the i/e motor 56 is not energized. Instead, when the carriage 41 reaches its home position, it actuates the microswitch 52 to notify the master controller that the card has been read and the latching arm can be disengaged. The master controller then deenergizes the solenoid 71 and the badge can be removed from the slot 11.

The preceding description has emphasized a badge /badge reader as a single unit; however, as a result of the modular type construction employed, either the card or badge reading areas can be easily removed. This permits conversion from a dual purpose reading station to a single purpose station or vice versa. The modular type construction is evident in the various FIGS. particularly FIGS. 1, 12, and 13. This modular type construction is expandable and various combinations are possible, for example, a dual card reader, a card and two badge reader, or a two badge reader.

While only one embodiment of the invention, together with modifications thereof, has been described in detail herein and shown in the accompanying drawings, it will be evident that various further modifications are possible in the arrangement and construction of its components without departing from the scope of the invention.

I claim:

1. A remote station document reader comprising:
- a housing including a reading area and an opening for receiving a coded document;
- a light source in said housing to illuminate the coded document inserted therein;
- a plurality of light responsive means positioned in said housing from said light source opposite the coded document inserted in said housing;
- a carriage movable in said housing from a home position to a second position having said light responsive means attached thereto;
- means for positioning the coded document inserted in said housing to be properly oriented between said light source and said light responsive means in the reading area;
- means for detecting when the coded document is properly oriented between said light source and said light responsive means in the reading area; and
- means for causing said carriage to traverse the reading area from its home position to its second position when the document is properly oriented, said light responsive means generating electrical signals when illuminated by light passing through the document from said light source.

2. A remote station document reader as set forth in Claim 1 including control means for sequencing the operation of said light source and said light responsive means with the orientation of the coded document in the reading area.

3. A remote station document reader as set forth in Claim 2 including a latch for holding the coded document in the reading area of said housing during the operation of said light responsive means.

4. A remote station document reader as set forth in Claim 1 including means for rejecting a document that is incorrectly inserted into said housing.

5. A remote station document reader as set forth in Claim 3 wherein said light responsive means are phototransistors.

6. A remote station document reader as set forth in Claim 5 wherein said orientation detecting means is a phototransistor.

7. A remote station reader for an identification badge having a punched hole code and a location aperture comprising:
- a housing having a reading area and an opening for receiving said coded identification badge;
- a light source positioned above the reading area to illuminate said area;
- a carriage movable in said housing from a home position to a second position and back to the home position; said carriage mounted below the reading area opposite said light source;
- a plurality of photodetectors attached to said carriage and movable therewith and responsive to light from said source;
- means for detecting when a badge has been fully inserted into the reading area of said housing through the opening;
- latch means responsive to a signal from said detecting means and including a latch arm for engaging the location aperture of said identification badge to hold said badge in the reading area; and drive means coupled to said carriage to activate said carriage to traverse the reading area from its home position to its second position after the identification badge has been latched in a reading position, said photodetectors attached to said carriage generating electrical signals when illuminated by light passing through the punched hole code on said identification badge from said light source.

8. A remote station identification badge reader as set forth in claim 7 including means for detecting when the latch arm of said latch means has fully engaged the location aperture of said identification badge.

9. A remote station identification badge reader as set forth in claim 8 including an electronic control circuit responsive to a signal from said detecting means to generate a signal to energize said latch means, and a second control circuit responsive to a signal from said latch arm detecting means to energize said drive means.

10. A remote station identification badge reader as set forth in claim 9 wherein said drive means includes an electric motor and a flexible belt for coupling said motor to said carriage.

11. A remote station identification badge reader as set forth in claim 10 including a first microswitch actuated when said carriage reaches its second position to change the direction of rotation of said electric motor, and a second microswitch actuated when said carriage returns to its home position to deenergize said electric motor.

12. A remote station card/badge reader for a punched hole coded card and an identification badge having a punched hole code and a location aperture comprising:

- a housing having a card reading area and a badge reading area and including a first opening to the badge reading area and a second opening to the card reading area;
- a light source located above the reading areas for illuminating said card and badge reading areas;
- a carriage mounted below the card and badge reading areas in said housing and movable from a home position to a second position and back to the home position;
- a plurality of light responsive means attached to said carriage and movable therewith;
- a badge detecting means for generating a signal when an identification badge is inserted into the badge reading area;
- a badge latch responsive to a signal from said badge detecting means and including a latch arm for engaging the location aperture in said identification badge;
- a card orientation means for properly orienting a coded card inserted through the opening to the card reading area between said light source and said light responsive means;
- a card detecting means for generating a signal when a coded card is properly oriented between said light source and said light responsive means in the card reading area; and
- drive means for causing said carriage to traverse the card and badge reading areas from the home position to the second position and back to the home position, said light responsive means generating electrical signals when illuminated by light passing through the reading areas.

13. A remote station card/badge reader as set forth in claim 12 wherein said badge latch includes means for detecting when the latch arm has engaged the location aperture of an identification badge.

14. A remote station card/badge reader as set forth in claim 13 wherein said card detecting means includes a first photodetector for generating a signal when a card is fully inserted into the card reading area and a second photodetector for generating a signal when a card has been improperly inserted into said reading area.

15. A remote station card/badge reader as set forth in claim 14 wherein said card orientation means includes an electric motor coupled to a drive wheel in engagement with a coded card in the card reading area.

16. A remote station card/badge reader as set forth in claim 15 further including:

- a first control means and generating a signal to energize said badge latch;
- a second control circuit responsive to a signal from said latch arm detecting means and generating a signal to energize said drive means when a badge has been properly inserted into the badge reading area;
- a third control circuit responsive to a signal from said second photodetector to generate a signal to reverse the direction of rotation of the motor coupled to said drive wheel to eject an improperly inserted card; and
- a fourth control circuit responsive to a signal from said first photodetector to generate a signal to said drive means when a card has been properly oriented into the card reading area.

17. A remote station card/badge reader as set forth in claim 12 wherein said light responsive means include a plurality of phototransistors.

18. A remote station card/badge reader as set forth in claim 17 including a clock track extending the length of said card and badge reading areas in alignment with one of said phototransistors.